United States Patent

Bloom et al.

[11] 4,219,826
[45] Aug. 26, 1980

[54] OPTICAL RECORDING MEDIUM

[75] Inventors: Allen Bloom, East Windsor; William J. Burke, Princeton Junction; Daniel L. Ross, Princeton, all of N.J.

[73] Assignee: RCA Corporation, New York, N.Y.

[21] Appl. No.: 923,350

[22] Filed: Jul. 10, 1978

[51] Int. Cl.² ............................................ G01D 15/34
[52] U.S. Cl. ........................ 346/135.1; 179/100.1 G; 346/76 L; 358/128.5; 430/945
[58] Field of Search .............. 346/76 L, 135; 250/316; 96/114.1; 350/1.1, 1.6, 1.7; 358/128; 179/100.1 G; 430/945, 348

[56] References Cited

U.S. PATENT DOCUMENTS

| | | | |
|---|---|---|---|
| 3,181,170 | 4/1965 | Akin | 346/108 |
| 3,588,216 | 6/1971 | Bloom | 350/1.6 |
| 3,665,483 | 5/1972 | Becker | 346/135 X |
| 4,069,487 | 1/1978 | Kasai | 346/135 X |
| 4,097,895 | 6/1978 | Spong | 346/135 X |

OTHER PUBLICATIONS

Schrauzer et al., Metal Complexes of Bisdithio-α-Diketone, JACS 87:7, Apr. 1965, pp. 1483-1489.
Bartolini et al., Review and Analysis of Optical Recording Media, Optical Engineering, vol. 15, No. 2, Mar.-/Apr., 1976, pp. 99-108.

*Primary Examiner*—Joseph W. Hartary
*Attorney, Agent, or Firm*—H. Christoffersen; B. E. Morris; W. J. Burke

[57] ABSTRACT

A recording medium comprises a substrate coated with a light reflecting layer which in turn is coated with a light absorbing layer selected from the group consisting of Pt complexes of bis-(dithio-α-diketones) which have the formula:

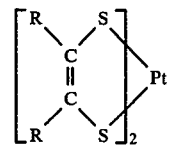

wherein R is a phenyl or substituted phenyl group. During recording, portions of the absorbing layer are ablated, vaporized or melted by an intensity-modulated, focussed light beam, thereby exposing portions of the reflective layer and recording video information as a reflective-antireflective pattern.

11 Claims, 3 Drawing Figures

OPTICAL RECORDING MEDIUM

This invention relates to a novel optical recording medium. More particularly, this invention relates to an optical recording medium for use with an AlGaAs solid state injection laser.

BACKGROUND OF THE INVENTION

Spong, U.S. Ser. No. 668,495, filed Mar. 19, 1976, now U.S. Pat. No. 4,097,895 has described a recording medium which comprises a light reflecting material, such as aluminum or gold, coated with a light absorbing layer, such as fluorescein which is operative with an argon laser light source. The thickness of the light absorbing layer is chosen so that the structure has minimum reflectivity.

An incident light beam ablates, vaporizes or melts the light absorbing layer, leaving a hole and exposing the light reflecting layer. After recording, at the wavelength of the recording light there will be maximum contrast between the minimum reflectance of the light absorbing layer and the reflectance of the light reflecting layer. Further, when the light reflecting material is itself a thin layer on a non-conductive substrate, little energy is lost either by reflection from the thin absorbing layer or by transmission through the reflecting layer. Thus, the energy absorbed from the light beam is concentrated into a very thin film and recording sensitivity is surprisingly high.

Because of its low input power requirement, small size and its capability for direct modulation of its optical output power by modulation of the electrical drive current, a solid state injection laser, in particular the AlGaAs laser which operates in the wavelength range from about 750 to 850 nanometers (nm), is a preferred light source for an optical recording system. Thus, materials which ablate, vaporize or melt at low temperatures upon absorption of optical energy in this wavelength range would be most useful in an optical recording system.

In order to be useful as a light absorbing layer for the above-described recording medium, materials must be able to be applied to a substrate in the form of a thin, smooth layer of high optical quality and a predetermined thickness; they must be absorbing at the frequency of the optical source employed; and they must ablate, vaporize or melt to form uniform holes.

Bloom et al, U.S. Ser. No. 837,853, filed Sept. 29, 1977, have described an ablative optical recording medium operative with an AlGaAs laser which comprises a substrate coated with a light reflecting layer, which in turn is coated with a light absorbing layer selected from the group consisting of lead phthalocyanine, chloroaluminum phthalocyanine, vanadyl phthalocyanine, stannic phthalocyanine and chloroaluminum chlorophthalocyanine.

These materials have the disadvantage, however, that their ablation temperature is in the range from 300° C. to 400° C. Materials with a lower ablation temperature would require less energy to reach this temperature and would thus be more sensitive. Thus, materials which absorb light between 750 nm and 850 nm, form specular, amorphous films and have a low melting temperature would be a significant improvement in the art.

SUMMARY OF THE INVENTION

An optical recording medium comprises a light reflecting layer and a layer which absorbs light having a wavelength of about 750 nm to about 850 nm comprising a platinum complex of bis-(dithio-α-diketones) where the substituents on the ethylenic group are phenyl or substituted phenyl groups.

FIG. is a schematic view of a recording and playback system in which the present recording medium can be employed.

DETAILED DESCRIPTION OF THE INVENTION

The light reflecting layer should reflect the light used for recording. Suitable light reflecting materials include aluminum, rhodium, gold and the like. The light reflecting material has a thickness such that it reflects substantially all the recording light.

Generally, the light reflecting layer is applied to a substrate. The substrate should have an optically smooth, flat surface to which the subsequently applied light reflecting layer is adherent. A glass plate or disc or a plastic disc is suitable. If the light reflecting material can be formed so it is a self-sustaining layer and optically smooth, the need for a substrate may be eliminated.

Materials which we have found useful as a light absorbing layer in this recording medium are Pt complexes of bis-(dithio-α-diketones) which have the formula:

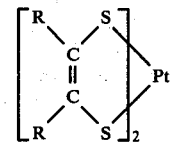

where at each occurrence R is a phenyl group or a phenyl group substituted with alkyl or alkoxy groups such as p-isopropylphenyl or p-methoxyphenyl. The preparation of these compounds has been described by Schranzer and Mayweg in J. Amer. Chem. Soc., Vol. 87, pp. 1483–89 (1965).

These materials absorb at the solid state injection laser wavelengths between 750 nm and 850 nm and all can be evaporated onto a light reflecting layer to give smooth, optical quality light absorbing layers in which information can be recorded at high signal to noise ratios.

The materials of the invention can be applied to the light reflecting layer by conventional vacuum evaporation. The material is charged to a suitable vessel fitted with a resistance heater and placed in a vacuum chamber. The heater is then connected to a source of electrical current. A substrate is positioned above the dye on a rotating holder. The substrate is then spun at about 50 rpm.

The vacuum chamber is evacuated to about $10^{-6}$ torr and current is applied to the heater to raise the temperature of the material to its evaporation temperature. Evaporation is continued until an absorbing layer of the required thickness is deposited onto the light reflecting layer, at which time the electrical current is shut off and the chamber vented.

The thickness of the evaporated layer is monitored using an optical system which measures the reflectivity of the reflecting surface coated with the material. The evaporation is stopped when the reflectivity reaches its minimum value.

The invention will be further explained by reference to the drawings.

Figure 1:
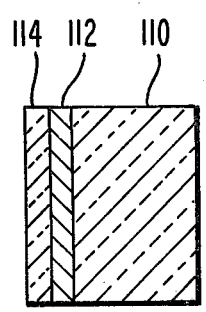
FIG. 1 is a cross-sectional view of a recording medium embodying the invention prior to recording.

FIG. 1 shows a recording medium embodying the invention prior to exposure to a recording light beam comprising a glass substrate 110, a light reflecting layer 112 comprising a layer of gold about 600 angstroms thick or other metal of suitable thickness, and a light absorbing layer 114 of one of the above mentioned materials.

Figure 2:
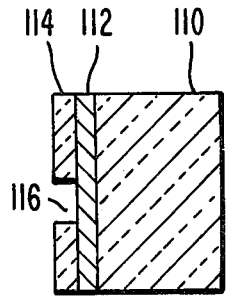
FIG. 2 is a cross-sectional view of a recording medium embodying the invention after recording.

FIG. 2 shows a recording medium embodying the invention after exposure to a recording light beam wherein the absorbing layer 114 has been ablated to leave a hole 116, exposing the light reflecting layer 112. It will be understood that a recording medium after recording contains a plurality of holes or pits 116 rather than the single one shown in FIG. 2.

Figure 3:
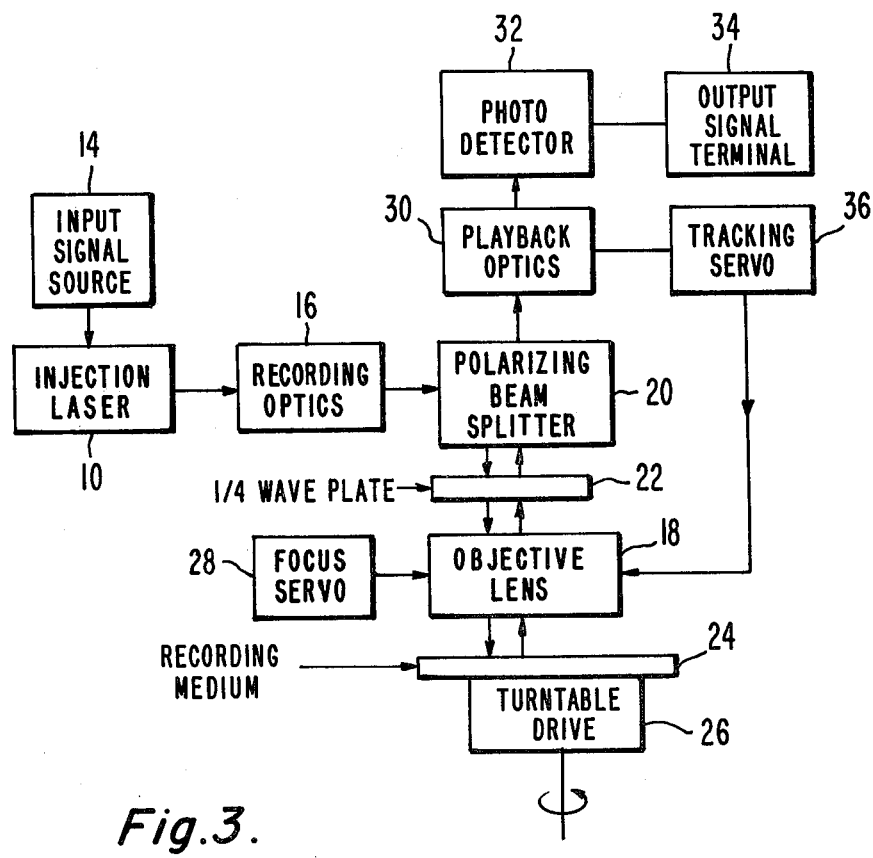

The use of the present recording medium can be explained in greater detail by referring to FIG. 3. For recording, the light emitted by an AlGaAs injection laser 10 is modulated directly in response to an input electrical signal 14. The modulated light beam is enlarged by recording optics 16 to increase the diameter of the intensity modulated laser beam so that it will fill the aperture of an objective lens 18 in the planes parallel and perpendicular to the plane of the laser 10. The enlarged modulated laser beam is totally reflected by a polarizing beam splitter 20 and passes through a quarter-wave plate 22 to the objective lens 18. The modulated recording beam then impinges upon a recording medium 24, as described in FIG. 1, and ablates or evaporates a portion of the light absorbing layer to expose a portion of the light reflecting layer. Recording medium 24 is rotated by the turntable drive 26 at about 1800 rpm. A focus servo 28 maintains a constant distance between the objective lens 18 and the surface of the recording medium 24.

For readout, an unmodulated and less intense laser beam, that is, one that will not cause ablation of the recording medium, follows the same path as the recording beam to the recording medium 24. The recorded reflection-antireflection pattern modulates the light reflected back through the objective lens 18 and the quater-wave plate 22. The light, now rotated by 90° in polarization by the two passages through the quater-wave plate 22, passes through the polarizing beam splitter 20 and is directed by playback optics 30 to a photodetector 32. The photodetector 32 converts the reflected light beam to an electrical output signal at terminal 34 which corresponds to the input signal from source 14. A tracking servo 36 monitors the light reflected through the playback optics 30 and deflects the incident light beam radially to insure that the incident light beam remains centered on the track of interest.

The invention will be further illustrated by the following Examples but the invention is not meant to be limited to the details described therein.

EXAMPLE 1

A vinyl disk substrate was coated by evaporating a layer of gold about 600 angstroms thick. The coated substrate was placed in a vacuum chamber above an evaporation boat containing the bis(diphenyl-dithio-α-diketone) complex of Pt and turned at 50 rpm. The vacuum chamber was evacuated to about $10^{-6}$ torr and a source of current was connected to the boat. The boat was heated to about 225°–275° C. at which temperature the shutter was opened and the material evaporated at a rate of about 4 angstroms per second. Evaporation was continued until an absorbing layer about 600 angstroms thick was deposited over the gold layer.

A smooth, amorphous, specular and continuous layer was deposited. The real (n) and imaginary (k) parts of the dielectric constant of the Pt bis(diphenyl-dithio-α-diketone) layer at 800 nm are 2.08 and 0.5 respectively.

The resultant recording medium was exposed to a series of 50 nanosecond light pulses having a wavelength of about 800 nm from an AlGaAs injection laser in an apparatus as in FIG. 3. The absorbing material was ablated from the disk by multiple exposure with 10 milliwatts incident on the disk.

EXAMPLE II

Following the general procedure of Example I, a gold coated substrate as in Example I was coated with a layer of the bis(di-p-isopropylphenyl-dithio-α-diketone) complex of Pt 1324 angstroms thick. The real (n) and imaginary (k) parts of the dielectric constant of the Pt bis(di-p-isopropylphenyl-dithio-α-diketone) layer at 800 nm are 1.75 and 0.78 respectively.

A smooth, amorphous, specular and continuous layer was deposited.

EXAMPLE III

Following the general procedure of Example I, a gold coated substrate as in Example I was coated with a layer of the bis(di-p-methoxyphenyl-dithio-α-diketone) complex of Pt 1900 angstroms thick. The real (n) and imaginary (k) parts of the dielectric constant of the Pt bis(di-p-methoxyphenyl-dithio-α-diketone) layer at 800 nm are 1.61 and 0.76 respectively.

A smooth, amorphous, specular and continuous layer was deposited. This film reduced the reflectivity of the recording medium to about 7% from about 95% reflectivity of the gold layer before the absorbing layer was added.

COMPARATIVE EXAMPLES

Following the general procedure of Example I, gold coated vinyl disks were coated with bis(dithio-α-diketone) complexes of Pt, Pd, or Ni with the same or differing substituted aryl or alkyl groups. The complexes belong to the class having the formula

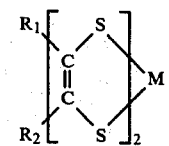

wherein M can be Pt, Pd or Ni and $R_1$ and $R_2$ can be alkyl, phenyl, or alkyl- or alkoxy-substituted phenyl. These materials produced either non-specular films or films with a poor antireflection condition upon evaporation. In almost all cases the films were initially hazy and proceeded to crystallize in a period of days. None of these dyes proved suitable for the present application. The data are summarized in Table I

TABLE I

| M  | $R_1$              | $R_2$              | COMMENTS                                       |
|----|--------------------|--------------------|------------------------------------------------|
| Pt | p-$CH_3O$—$C_6H_4$ | $C_6H_5$           | film crystallized                              |
| Pd | p-i-$C_3H_7$—$C_6H_4$ | p-i-$C_3H_7$—$C_6H_4$ | film cloudy                                 |
| Pd | $C_6H_5$           | $C_6H_5$           | film cloudy, no absorption                     |
| Ni | $C_6H_5$           | $C_6H_5$           | film cloudy                                    |
| Ni | p-$CH_3O$—$C_6H_4$ | $C_6H_5$           | clear film, small absorption and high reflectivity |
| Ni | p-i-$C_3H_7$—$C_6H_4$ | p-i-$C_3H_7$—$C_6H_4$ | film cloudy                                 |
| Ni | p-$CH_3O$—$C_6H_4$ | p-$CH_3O$—$C_6H_4$ | film cloudy                                    |
| Ni | n-$C_3H_7$         | n-$C_3H_7$         | film became hazy immediately                   |
| Ni | $C_2H_5$           | $C_2H_5$           | film became hazy immediately                   |

We claim:

1. In an ablative optical recording medium, for use with a recording laser providing light of a given frequency, which comprises a light reflecting layer coated with a smooth, specular, amorphous, optical quality light absorbing layer, the improvement which comprises employing as the light absorbing layer a Pt bis(dithio-α-diketone) complex having the formula

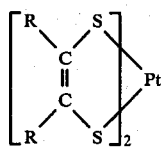

where R is a phenyl or a substituted phenyl group.

2. A recording medium according to claim 1 where R is a phenyl group.

3. A recording medium according to claim 1 where R is a p-isopropylphenyl group.

4. A recording medium according to claim 1 where R is a p-methoxyphenyl group.

5. A recording medium according to claim 1 wherein the thickness of said absorbing layer is chosen so as to minimize the reflectivity at wavelengths between about 750 nanometers and about 850 nanometers.

6. In an information record, for use in playback apparatus employing a playback beam of light of a given frequency, which comprises a light reflecting layer coated with a smooth, specular, amorphous, optical quality light absorbing layer, with an information track formed in said absorbing layer, the improvement which comprises employing as the light absorbing layer a Pt bis(dithio-α-diketone) complex having the formula

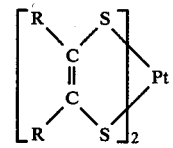

where R is a phenyl or a substituted phenyl group.

7. An information record according to claim 6 wherein said information track comprises a succession of spaced pits in said absorbing layer which are representative of recorded information.

8. An information record according to claim 6 where R is a phenyl group.

9. An information record according to claim 6 where R is a p-isopropylphenyl group.

10. An information record according to claim 6 where R is a p-methoxyphenyl group.

11. An information record according to claim 6 wherein the thickness of said absorbing layer is chosen so as to minimize the reflectivity at wavelengths between about 750 nanometers and about 850 nanometers.

* * * * *